United States Patent [19]

Hall

[11] 4,288,332

[45] Sep. 8, 1981

[54] METHODS AND COMPOSITIONS FOR TREATING SUBTERRANEAN FORMATIONS

[75] Inventor: Bobby E. Hall, Duncan, Okla.

[73] Assignee: Halliburton Company, Duncan, Okla.

[21] Appl. No.: 70,286

[22] Filed: Aug. 27, 1979

Related U.S. Application Data

[63] Continuation of Ser. No. 770,881, Feb. 22, 1977, abandoned, which is a continuation-in-part of Ser. No. 533,375, Dec. 16, 1974, abandoned.

[51] Int. Cl.³ .............................................. E21B 43/27
[52] U.S. Cl. ........................... 252/8.55 C; 166/305 R; 166/307; 252/8.55 R
[58] Field of Search .................... 252/8.55 C, 8.55 D, 252/8.55 E, 8.55 R; 166/259, 271, 281, 282, 295, 304, 305 R, 307, 312

[56] References Cited

U.S. PATENT DOCUMENTS

| | | | |
|---|---|---|---|
| 2,356,205 | 8/1944 | Blair et al. | 252/8.55 |
| 3,083,158 | 3/1963 | Markham | 252/8.55 |
| 3,508,612 | 4/1970 | Reisberg et al. | 252/8.55 X |
| 3,902,557 | 9/1975 | Shaughnessy et al. | 166/295 |
| 4,005,020 | 1/1977 | McCormick | 252/8.55 |

*Primary Examiner*—Herbert B. Guynn
*Attorney, Agent, or Firm*—Edward F. Sherer; Thomas R. Weaver; John H. Tregoning

[57] ABSTRACT

Methods and compositions for treating subterranean formations whereby the loss of formation adsorbable additives from the treating compositions is reduced or prevented by including in such compositions certain methyl ether, sulfate ester or amine compounds.

17 Claims, No Drawings

METHODS AND COMPOSITIONS FOR TREATING SUBTERRANEAN FORMATIONS

This application is a continuation of application Ser. No. 770,881, filed Feb. 22, 1977, which is a continuation-in-part of application Ser. No. 533,375, filed Dec. 16, 1974, both now abandoned.

Aqueous treating solutions are commonly utilized in treatments carried out in subterranean formations penetrated by well bores to stimulate the production of fluids from such formations. For example, aqueous acid solutions are often used to increase the permeability of a formation by injection of an aqueous acid solution into the formation so that mineral constituents contained therein are dissolved and flow channels are produced. Aqueous acid solutions and other aqueous treating solutions are also utilized in carrying out treatments in subterranean formations whereby the formations are fractured and the fractures propped open, or the formations are fractured and the fracture faces are acidized to produce flow channels therein. In these and other methods of treating subterranean formations utilizing aqueous treating solutions, difficulties are often encountered due to water-oil emulsions which are formed at the interfaces between the injected aqueous treating solutions and crude oil contained in the formations. Fines and insoluble reaction products which are formed accumulate at the oil-water interfaces and stabilize the emulsions which in turn tend to plug the pore spaces in the formations being treated and restrict the flow of the treating solutions and subsequent production of fluids therethrough. In addition, and particularly where aqueous acid treating solutions are utilized, sludge formed as a result of the reaction of the acid with asphaltic materials contained in the crude oil can plug the pore spaces of the formations.

Heretofore, difficulties of the above-mentioned type encountered in treating siliceous formations with aqueous treating solutions have been particularly severe. Siliceous formations are those containing sandstone and/or other materials which include silicates. While a variety of additives having surface active properties have been developed for preventing the formation of emulsions, sludge, etc., as well as preventing the corrosion of metal surfaces, and have been included in the various treating solutions employed, less than desirable results are often achieved.

The ineffectiveness of such prior aqueous treating solutions and treatments carried out in subterranean formations utilizing such solutions, and particularly in siliceous formations, is primarily due to the loss of the additives contained in the treating solutions to materials contained in the formations. That is, material surfaces present in the treated formations adsorb the various surface active additives included in the treating solutions whereby the additives are prevented from functioning. This problem is particularly severe in the interstitial acidizing of a formation whereby an aqueous acid solution is pumped into the formation at a pressure level below the formation fracturing pressure in that the acid solution contacts an extremely large amount of material surface in the formation which adsorbs surface active additives contained in the acid solution.

By the present invention, improved aqueous treating compositions and methods of using such compositions for treating subterranean formations are provided whereby the adsorption of additives and the removal thereof from the compositions is reduced or prevented so that such additives remain in the treating compositions and achieve their designed functions.

In accordance with the present invention, one or more chemicals having the property of reducing the adsorption of additives having surface active properties contained in aqueous treating compositions are combined with the aqueous treating compositions thereby avoiding the difficulties brought about by sludge, emulsions, corrosion, etc., mentioned above. Further, the chemicals utilized in accordance with the invention are stable in the presence of acid, i.e., the chemicals do not react with acids to produce compounds that have adverse effects when mixed with formation fluids subsequently produced from the treated formations.

The chemicals which are utilized in accordance with the present invention are those having the general formula:

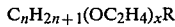

$$C_nH_{2n+1}(OC_2H_4)_xR$$

wherein:

n has a value in the range of from about 4 to about 12;
x has a value in the range of from about 0 to about 10; and
R is a radical selected from the group consisting of —$OCH_3$, —$OSO_3^-M^+$ and —$NH_2$ wherein $M^+$ is preferably one of $H^+$, $NH_4^+$, $Na^+$ and $K^+$. $M^+$ can be other cations than those specifically defined above which, as stated, are considered to be preferred. $M^+$ can be selected from divalent cations such as $Ca^{++}$, $Mg^{++}$ and others.

Examples of chemicals described above are pentyl polyoxyethyl(3) methyl ether, pentyl polyoxyethyl(4) methyl ether, pentyl polyoxyethyl(5) methyl ether, isobutyl sulfate, pentyl sulfate, pentyl polyoxyethyl(3) sulfate and butoxy ethyl amine.

In subterranean formations, the above described chemicals render the formations, as well as the fines and insoluble reaction products contained therein water wet thereby retarding the formation of solid stabilized water-oil emulsions and improving the oil permeability of the formations. More importantly, as stated above, the chemicals reduce or prevent the adsorption on surfaces in a formation being treated of both cationic and anionic surfactants and other additives having surface active properties which function as demulsifiers, anti-sludgers, surface tension reducers, corrosion inhibitors, etc., in aqueous treating solutions.

The novel compositions of this invention for treating subterranean formations are basically comprised of an aqueous treating solution containing at least one surface active additive for imparting desired properties to the treating solution and/or to the formation to be treated and a chemical of the type described above which has the property of reducing the adsorption of said additive on materials contained in the formation.

The additive or additives included in the compositions for imparting desired properties thereto and to formations treated with the compositions can be any of a variety of materials having surface active properties. For example, corrosion inhibitors designed to protect tubular goods and other equipment surfaces contacted by acid treating solutions against acid attack while have been utilized heretofore include inorganic arsenic compounds, acetylenic alcohols, thiophenols, heterocyclic nitrogen compounds, substituted thioureas, rosin amine derivatives, quaternary ammonium compounds, and other similar compounds. A particularly suitable corrosion inhibitor for use with the acid treating compositions of the present invention is a mixture of propargyl alcohol, alkyl pyridine, methyl Formcel, diacetone alcohol and ethyl octynol.

Conventional additives which function as demulsifiers, wetting agents, anti-sludge agents and retarding agents and which have surface active properties can be utilized, as can surfactants which function to gel the treating compositions, reduce the pressure drop while the compositions are being introduced into the formation to be treated, reduce fluid losses during treatment of the formation, temporarily plug more permeable portions of the formation and others.

Particularly suitable additives which function as demulsifiers in aqueous solutions are alkyl benzene sulfonate, myristic dimethyl benzene ammonium chloride and decyl trimethyl ammonium chloride. Myristic dimethyl benzene ammonium chloride is preferred for use in accordance with the present invention. A preferred additive which functions as an anti-sludge agent is dodecyl benzene sulfonate. A preferred additive which functions as a surface tension reducing agent is ethyoxylated nonyl phenol.

The concentrations of the additives utilized in the compositions of this invention can vary depending upon the particular formation to be treated, the particular treating solution utilized and the particular additives used. Generally, however, the additives are utilized in the compositions in amounts in the range of from about 0.1% to about 10% by volume of the compositions.

In aqueous acid treating compositions of the present invention, demulsifying additives are preferably utilized in an amount in the range of from about 0.1% to about 5% by volume of water and acid used. Anti-sludge additives are preferably utilized in the compositions in an amount in the range of from about 0.1% to about 2% by volume of water and acid used, surface tension reducing additives are preferably utilized in an amount in the range of from about 0.1% to about 1% by volume of water and acid used, and corrosion inhibitor additives are preferably utilized in an amount in the range of from about 0.1% to about 2% by volume of water and acid used.

The concentration in the treating compositions of the chemical or chemicals mentioned above for reducing the adsorption of additives on formation surfaces can vary over a range of from about 1% to about 90% by volume of the compositions. At concetrations of less than about 1% by volume too little of the chemical is present in the compositions to effectively reduce absorption of the additives. At concentrations above about 90% by volume of the compositions, more chemical is generally present than necessary to effectively reduce adsorption of the additives. While the particular concentration of the adsorption reducing chemical utilized depends on a variety of factors such as the particular size and type of formation to be treated, the chemical or chemicals are preferably utilized in the compositions in an amount in the range of from about 5% to about 10% by volume of the compositions.

In treating subterranean formations to increase the permeability thereof by contacting the formations with an aqueous acid solution, the particular acid employed will depend in part upon the particular type of formation to be treated. Suitable acids for treating siliceous formations are hydrochloric acid, hydrofluoric acid, phosphoric acid, acetic acid, formic acid, and mixtures of two or more of said acids. Aqueous hydrochloric acid solutions and aqueous solutions containing a mixture of hydrochloric and hydrofluoric acids are preferred for use in accordance with the present invention.

A particularly suitable composition for acidizing siliceous formations is comprised of water; an acid selected from the group consisting of hydrochloric acid, hydrofluoric acid, phosphoric acid, acetic acid, formic acid and a mixture of two or more of said acids, the acid being present in the composition in an amount in the range of from about 1% to about 15% by weight of water and acid utilized; at least one surface active additive for imparting desired properties to the composition and to the siliceous formation to be treated present in the composition in an amount in the range of from about 0.1% to about 10.0% by volume of the water and acid utilized; and a chemical of the type described above having the property of reducing the adsorption of the additive on silicate surfaces present in the composition in an amount in the range of from about 1% to about 90% by volume of the composition.

A particularly preferred composition including hydrochloric acid is comprised of water, hydrochloric acid present in an amount in the range of from about 5% to about 7.5% by weight of water and acid used; a surface active demulsifying additive present in an amount in the range of from about 0.1% to about 5% by volume of water and acid used; a surface active anti-sludge additive present in an amount in the range of from about 0.1% to about 2% by volume of water and acid used; a surface tension reducing additive present in an amount in the range of from about 0.1% to about 1% by volume of water and acid used; a surface active corrosion inhibitor additive present in an amount in the range of from about 0.1% to about 2% by volume of water and acid used; and a chemical having the property of reducing the adsorption of the additives on formation surfaces selected from the group consisting of pentyl polyoxyethyl(4) methyl ether, pentyl polyoxyethyl(5) methyl ether, pentyl sulfate, and butoxy ethyl amine, said chemical being present in said composition in an amount in the range of from about 5% to about 10% by volume of said composition.

In all of the compositions mentioned above, the chemicals for reducing the adsorption of additives on formation surfaces described herein are stable and do not react with the acids in the compositions. This is particularly important when acids such as hydrochloric acid are utilized in the compositions in that if the chemicals react to form organic chlorides, such organic chlorides contaminate hydrocarbons subsequently produced from the treated formation. Such contamination presents a problem when the hydrocarbons are refined in that the organic chlorides poison catalysts commonly used in refineries.

The methods of this invention for reducing the loss of additives having surface active properties from aqueous treating solutions utilized in the treatment of subterranean formations comprise the steps of combining with the treating solution a chemical having the property of reducing the adsorption of said additives on material surfaces in the formation and having the general formula:

$$C_nH_{2n+1}(OC_2H_4)_xR$$

wherein:
n has a value in the range of from about 4 to about 12;

x has a value in the range of from about 0 to about 10; and

R is a radical selected from the group consisting of —$OCH_3$, —$OSO_3^-M^+$ and —$NH_2$
wherein $M^+$ is preferably one of $H^+$, $NH_4^+$, $Na^+$ and $K^+$. $M^+$ can be other cations than those specifically defined above which, as stated, are considered to be preferred. $M^+$ can be selected from divalent cations such as $Ca^{++}$, $Mg^{++}$ and others; and introducing the treating solution-chemical mixture into the formation.

In carrying out acidizing treatments in subterranean formations to stimulate the production of fluids therefrom in accordance with the present invention, an aqueous acid composition capable of dissolving mineral constituents present in the formation containing at least one surface active additive for imparting desired treating properties to the acid solution and to the formation and containing a chemical of the type described above having the property of reducing the adsorption of the additive on surfaces in the formation is introduced into the formation. After the acid composition has spent itself in the formation, i.e., used up its capacity to dissolve mineral constituents therein, the composition is recovered from the formation. As will be apparent, because the aqueous treating composition contains additives for imparting desired properties to the composition and to the formation being treated, and contains a chemical preventing the adsorption and removal of such additives from the composition, the treatment is carried out without encountering difficulties of the type mentioned above.

In carrying out the method of the present invention for improving the permeability of a siliceous formation, the formation is treated with an aqueous acid composition containing an acid selected from the group consisting of hydrochloric acid, hydrofluoric acid, phosphoric acid, acetic acid, formic acid and mixtures of two or more of such acids, additives selected from the group consisting of surface active corrosion inhibitors, surface tension reducing agents, demulsifiers, anti-sludge agents and mixtures thereof and one or more chemicals of the type described above having the property of reducing the adsorption of the additives on silicate surfaces.

A presently preferred technique for acidizing a siliceous formation in accordance with the present invention involves preflushing the formation by introducing thereinto a composition of the present invention comprised of water, hydrochloric acid present in the composition in an amount in the range of from about 5% to about 7.5% by weight of water and acid used, surface active demulsifying, anti-sludge, surface tension reducing, and corrosion inhibitor additives present in the composition in an amount in the range of from about 0.1% to about 10% by volume of water and acid used, and a chemical for reducing the adsorption of said demulsifying, anti-sludge, surface tension reducing, and corrosion inhibitor additives on said formation selected from the group consisting of pentyl polyoxyethyl(4) methyl ether, pentyl polyoxyethyl(5) methyl ether, pentyl sulfate and butoxy ethyl amine, said chemical being present in the composition in an amount in the range of from about 5% to about 10% by volume of the composition.

After the preflushing step with the hydrochloric acid composition described above is carried out, a second acid treating solution is introduced into the formation comprised of water, hydrochloric acid present in an amount of about 12% by weight of water and acid used and hydrofluoric acid present in an amount of about 3% by weight of water and acid used.

The preflush treating composition functions to dissolve carbonaceous materials contained in the formation, shrink swollen clays and condition the formation with the additives utilized. The subsequent introduction of the hydrochloric-hydrofluoric acid treating composition brings about the dissolution of siliceous and other materials contained in the formation thereby increasing the permeability thereof. Because the preflush composition contains the additives and a chemical preventing the adsorption thereof on silicate surfaces, the subsequently introduced hydrochloric-hydrofluoric acid composition generally need not contain additional additives and chemical. However, to insure that emulsions, sludge, etc., are not formed in the formation, additional additives and chemical can be combined with the hydrochloric-hydrofluoric acid composition.

After the formation has been contacted with the hydrochloric-hydrofluoric acid composition whereby it has become spent, it, as well as the preflush composition, are recovered from the formation by producing the formation through tubular goods disposed in the well bore and surface equipment. Because the additives remain in the treating compositions throughout the treatment, the formation of emulsions and sludge and corrosion of the tubular goods and surface equipment is reduced or prevented. Further, the surface tension reducing additives remaining in the spent treating solutions bring about fast clean-up of the formation and equipment and minimize down time.

An alternate preferred technique for carrying out the method of the present invention involves introducing a first aqueous treating composition into the formation comprised of one or more of the various surface active additives mentioned above in an amount of about 10% by volume of the composition and one or more of the chemicals mentioned above having the property of preventing adsorption of the additives present in the composition in an amount of about 90% by volume. This first composition is introduced into the formation in a quantity sufficient to condition the formation and provide a barrier of additives and chemical between the natural fluids contained in the formation and subsequently introduced treating fluids.

The introduction of the additives-chemical solution is followed by the introduction of the acid containing compositions of the present invention which dissolve mineral constituents contained in the formation without the formation of emulsions, sludge, etc., after which the compositions are recovered from the formation. As will be apparent, the first treating composition introduced into the formation can contain a quantity of additives and chemical sufficient to produce the results required without the necessity of including additives and chemicals in the subsequently introduced treating compositions. However, it is preferred that even when a first treating composition is employed containing only additives and chemicals, the subsequent acid containing treating compositions also include additives and chemicals to insure the additives are continuously present in the various compositions and perform their designed functions.

The present invention is further illustrated by the following examples.

EXAMPLE 1

Acid treating compositions of the present invention are prepared comprised of water, hydrochloric acid present in the compositions in an amount of 7.5% by weight of water and acid, a surface active corrosion inhibitor additive, namely, a mixture of propargyl alcohol, alkyl pyridine, methyl Formcel, diacetone alcohol and ethyl octynol present in the compositions in an amount of 0.1% by volume of water and acid used, a demulsifying and surface tension reducing additive, namely myristic dimethyl benzene ammonium chloride present in the compositions in an amount of 0.5% by volume of water and acid used, and the chemical for reducing the adsorption of the additives on formation surfaces shown in Table I below present in the compositions in an amount of 10% by volume of the compositions.

The various compositions are flowed through a column containing siliceous materials, i.e., one part bentonite and 24 parts Okla. No. 1 sand, at a temperature of 72° F., and the change in surface tension and emulsion tendency of the compositions after flowing through the column are determined. That is, the surface tension and emulsion efficiency of each composition are determined before and after flowing through the silicate column so that the loss of additives due to the adsorption thereof on the silicate materials contained in the column is illustrated.

The surface tensions of the compositions are tested using a conventional du Nouy Tensiometer. The emulsion efficiencies of the compositions are determined by mixing equal volumes of samples of the compositions and oil in a high speed stirrer for one minute, transferring the resulting emulsion into a graduated cylinder and after allowing the emulsion to stand for ten minutes noting the volume of liquid which is separated. The separated volume of liquid is then converted to percent of the total volume of composition tested so that the emulsion efficiency of the composition is expressed in percent.

The results of these tests are shown in Table I below.

EXAMPLE 2

Mixtures of aqueous 15% by weight hydrochloric acid solutions and the chemicals for reducing the adsorption of additives on formation surfaces shown in Table II below are prepared with the chemicals being present in the mixtures in an amount of 10% by volume of the mixtures. The mixtures are heated to a temperature of 250° F. while exerting a pressure of 500 psig. on the mixtures using nitrogen for one hour each. The hydrochloric acid strengths before and after heating the mixtures are determined as set forth in Table II below.

TABLE II

COMPARISON OF HYDROCHLORIC ACID SOLUTION STRENGTH BEFORE AND AFTER REACTING WITH VARIOUS ADSORPTION REDUCING CHEMICALS

| Adsorption Reducing Chemical in Mixture | Formula | Acid Strength Before Heating | Acid Strength After Heating |
|---|---|---|---|
| Pentyl polyoxyethyl(4) methyl ether | $C_5H_{11}(OC_2H_4)_4OCH_3$ | 4.135N | 4.235N |
| Pentyl sulfate | $C_5H_{11}OSO_3^-H^+$ | 4.13N | 4.24N |
| Butoxy ethyl amine | $C_4H_9(OC_2H_4)NH_2$ | 3.93N | 3.92N |

From Table II it can clearly be seen that the additive adsorption reducing chemicals of this invention do not react with aqueous hydrochloric acid solutions to form organic chlorides in that the strengths of the acid before and after heating so not change appreciably.

What is claimed is:

1. A composition for treating a subterranean formation comprising:

an aqueous acid solution capable of dissolving mineral constituents contained in said formation;

at least one additive having surface active properties present in said aqueous treating solution for imparting desired treating properties to said solution and to said formation to be treated; and a chemical having the property of reducing the adsorption of said additive on material surfaces pres-

TABLE I

COMPARISON OF SURFACE TENSION REDUCER AND DEMULSIFIER ADDITIVE ADSORPTION ON SILICATE SURFACES FROM VARIOUS AQUEOUS ACID COMPOSITIONS

| Adsorption Reducing Chemical In Composition | Formula | Increase in Surface Tension of Composition After Contacting Silicate Surfaces, Dynes/cm. | Change in Emulsion Efficiency of Composition After Contacting Silicate Surfaces (Percent Settled After Contact Less Percent Settled Before Contact) |
|---|---|---|---|
| None | | 29.7 | −96 |
| Pentyl polyoxyethyl(3) methyl ether | $C_5H_{11}(OC_2H_4)_3OCH_3$ | 6.6 | −10 |
| Pentyl polyoxyethyl(4) methyl ether | $C_5H_{11}(OC_2H_4)_4OCH_3$ | 4.8 | 0 |
| Pentyl polyoxyethyl(5) methyl ether | $C_5H_{11}(OC_2H_4)_5OCH_3$ | 3.7 | +4 |
| Isobutyl sulfate | $C_2H_5(CHOSO_3^-H^+)CH_3$ | 14.4 | +20 |
| Pentyl sulfate | $C_5H_{11}OSO_3^-H^+$ | 4.9 | 0 |
| Pentyl polyoxy ethyl(3) sulfate | $C_5H_{11}(OC_2H_4)_3OSO_3^-H^+$ | 10.6 | +10 |
| butoxy ethyl amine | $C_4H_9(OC_2H_4)NH_2$ | 2.8 | +5 |

From Table I it can clearly be seen that the additive adsorption reducing chemicals and compositions of this invention effectively reduce or prevent additives in the compositions from being adsorbed on silicate surfaces.

ent in said formation, said chemical being present in said composition in the range of from about 1% to about 90% by volume of said composition and having the general formula:

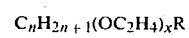

wherein:

n has a value in the range of from about 4 to about 12;

x has a value in the range of from about 1 to about 10; and

R is a radical selected from the group consisting of —OCH$_3$, —OSO$_3^-$M$^+$ and —NH$_2$, wherein M$^+$ is one of H$^+$, NH$_4^+$, Na$^+$, K$^+$, Ca$^{++}$ and Mg$^{++}$.

2. A method of reducing the loss of adsorbable surface active additives from an aqueous treating solution utilized in the treatment of subterranean formations comprising the steps of:

combining with said aqueous treating solution a chemical having the property of reducing the adsorption of said additives on material surfaces in said formation present in said composition in an amount in the range of from about 1% to about 90% by volume of said composition, said chemical having the general formula:

$$C_nH_{2n+1}(OC_2H_4)_xR$$

wherein:

n has a value in the range of from about 4 to about 12;

x has a value in the range of from about 1 to about 10; and

R is a radical selected from the group consisting of —OCH$_3$ and —NH$_2$.

3. A composition for treating a subterranean formation comprising:

an aqueous acid solution capable of dissolving mineral constituents contained in said formation;

at least one additive having surface active properties present in said aqueous treating solution for imparting desired treating properties to said solution and to said formation to be treated; and a chemical having the property of reducing the adsorption of said additive on material surfaces present in said formation, said chemical being present in said composition in the range of from about 1% to about 90% by volume of said composition and having the general formula:

$$C_nH_{2n+1}R$$

wherein:

n has a value in the range of from about 4 to about 12;

R is —OCH$_3$.

4. A composition for treating a subterranean formation comprising:

an aqueous acid solution capable of dissolving mineral constituents contained in said formation;

at least one additive having surface active properties present in said aqueous treating solution for imparting desired treating properties to said solution and to said formation to be treated; and a chemical having the property of reducing the adsorption of said additive on material surfaces present in said formation, said chemical being present in said composition in the range of from about 1% to about 90% by volume of said composition wherein said chemical is selected from the group consisting of pentyl polyoxyethyl(3) methyl ether, pentyl polyoxyethyl(4) methyl ether, pentyl polyoxyethyl(5) methyl ether, isobutyl sulfate, pentyl sulfate, pentyl polyoxyethyl(3) sulfate and butoxy ethyl amine.

5. The composition of claim 4 wherein the acid in said aqueous acid solution is selected from the group consisting of hydrochloric acid, hydrofluoric acid, phosphoric acid, acetic acid, formic acid and mixtures of two or more of said acids, and wherein said acid is present in said aqueous acid solution in an amount in the range of from about 1% to about 15% by weight of said acid solution.

6. A composition for treating a subterranean formation to improve the permeability thereof comprising:

water;

an acid selected from the group consisting of hydrochloric acid, hydrofluoric acid, phosphoric acid, acetic acid, formic acid, and mixtures of two or more of said acids, said acid being present in said composition in an amount in the range of from about 1% to about 15% by weight of water and acid utilized;

at least one additive having surface active properties for imparting desired treating properties to said acid solution and said formation present in said composition in an amount in the range of from about 0.1% to about 10.0% by volume of water and acid utilized; and a chemical having the property of reducing the adsorption of said additive on material surfaces in said formation present in said composition in an amount in the range of from about 1% to about 90% by volume of said composition, wherein said chemical is selected from the group consisting of pentyl polyoxyethyl(3) methyl ether, pentyl polyoxyethyl(4) methyl ether, pentyl polyoxyethyl(5) methyl ether, isobutyl sulfate, pentyl sulfate, pentyl polyoxyethyl(3) sulfate and butoxy ethyl amine.

7. The composition of claim 6 wherein said additive is selected from the group consisting of corrosion inhibitors, surface tension reducing agents, demulsifiers, anti-sludge agents, and mixtures thereof.

8. The composition of claim 7 wherein said chemical is selected from the group consisting of pentyl polyoxyethyl(4) methyl ether, pentyl polyoxyethyl(5) methyl ether, pentyl sulfate, and butoxy ethyl amine.

9. The composition of claim 8 wherein said chemical is present in said composition in an amount in the range of from about 5% to about 10% by volume of said composition.

10. A method of reducing the loss of adsorbable surface active additives from an aqueous treating solution utilized in the treatment of subterranean formations comprising the steps of:

combining with said aqueous treating solution a chemical having the property of reducing the adsorption of said additives on material surfaces in said formation present in said composition in an amount in the range of from about 1% to about 90% by volume of said composition, said chemical being selected from the group consisting of pentyl polyoxyethyl(3) methyl ether, pentyl polyoxyethyl(4) methyl ether, pentyl polyoxyethyl(5) methyl ether, isobutyl sulfate, pentyl sulfate, pentyl polyoxyethyl(3) sulfate and butoxy ethyl amine.

11. The method of claim 10 wherein said chemical is selected from the group consisting of pentyl polyoxyethyl(4) methyl ether, pentyl polyoxyethyl(5) methyl ether, pentyl sulfate, and butoxy ethyl amine.

12. The method of claim 11 wherein said chemical is present in said treating solution-chemical mixture in an amount in the range of from about 5% to about 10% by volume of said mixture.

13. A method of improving the permeability of a subterranean formation comprising:

introducing into said formation an aqueous acid composition capable of dissolving mineral constituents contained in said formation, said aqueous acid composition containing at least one surface active additive for imparting desired treating properties to said composition and to said formation, and a chemical having the property of reducing the adsorption of said additive on material surfaces in said formation, said chemical being present in said composition in an amount in the range of from about 1% to about 90% by volume of said composition, said chemical being selected from the group consisting of pentyl polyoxyethyl(3) methyl ether, pentyl polyoxyethyl(4) methyl ether, pentyl polyoxyethyl(5) methyl ether, isobutyl sulfate, pentyl sulfate, pentyl polyoxyethyl(3) sulfate and butoxy ethyl amine, and recovering said composition from said formation.

14. The method of claim 13 wherein the acid in said composition is selected from the group consisting of hydrochloric acid, hydrofluoric acid, phosphoric acid, acetic acid, formic acid and mixtures of two or more of said acids.

15. The method of claim 14 wherein said chemical is selected from the group consisting of pentyl polyoxyethyl(4) methyl ether, pentyl polyoxyethyl(5) methyl ether, pentyl sulfate and butoxy ethyl amine.

16. The method of claim 15 wherein said chemical is present in said treating solution-chemical mixture in an amount in the range of from about 5% to about 10% by volume of said mixture.

17. The method of claim 16 wherein said additive is present in said composition in an amount in the range of from about 0.1% to about 10% by volume of said composition.

* * * * *

UNITED STATES PATENT AND TRADEMARK OFFICE
CERTIFICATE OF CORRECTION

PATENT NO. : 4,288,332
DATED : September 8, 1981
INVENTOR(S) : Bobby E. Hall

It is certified that error appears in the above-identified patent and that said Letters Patent are hereby corrected as shown below:

At Column 2, in line 64, delete [while] and insert --which--.

Signed and Sealed this

Twenty-fourth Day of November 1981

[SEAL]

Attest:

GERALD J. MOSSINGHOFF

Attesting Officer     Commissioner of Patents and Trademarks